No. 803,684. PATENTED NOV. 7, 1905.
J. A. FLEMING.
INSTRUMENT FOR CONVERTING ALTERNATING ELECTRIC CURRENTS
INTO CONTINUOUS CURRENTS.
APPLICATION FILED APR. 19, 1905.
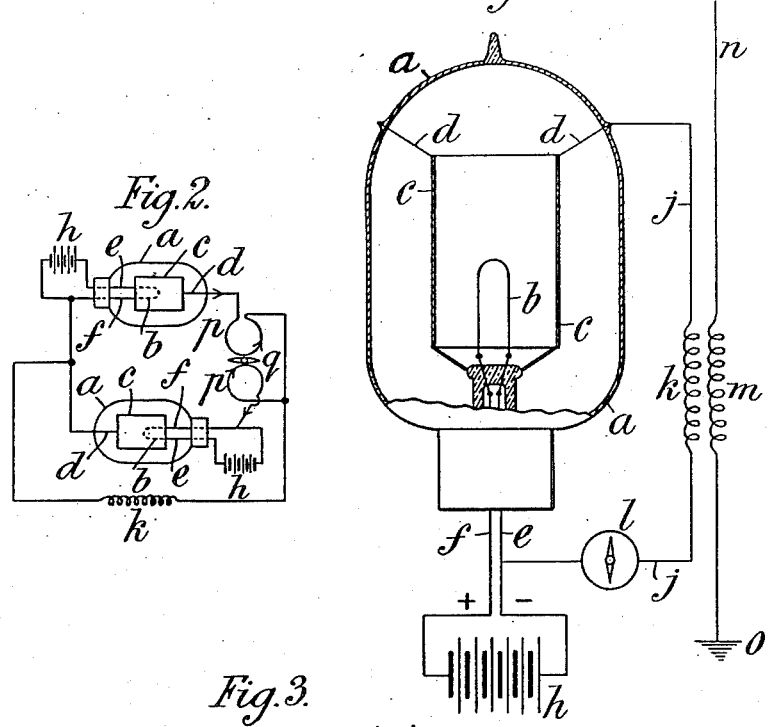
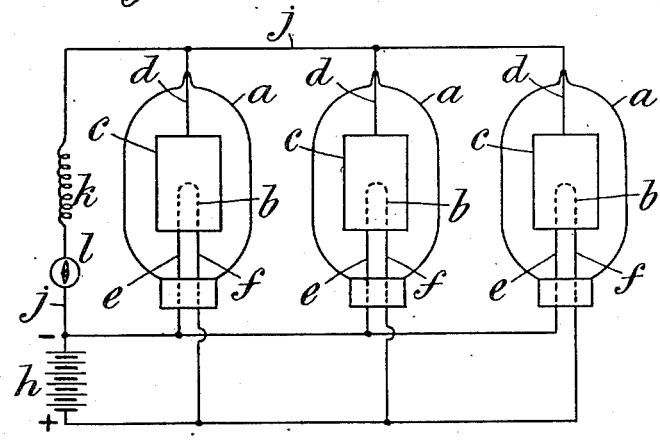

UNITED STATES PATENT OFFICE.

JOHN AMBROSE FLEMING, OF LONDON, ENGLAND, ASSIGNOR TO MARCONI WIRELESS TELEGRAPH COMPANY OF AMERICA, A CORPORATION OF NEW JERSEY.

INSTRUMENT FOR CONVERTING ALTERNATING ELECTRIC CURRENTS INTO CONTINUOUS CURRENTS.

No. 803,684.     Specification of Letters Patent.     Patented Nov. 7, 1905.

Application filed April 19, 1905. Serial No. 256,483.

*To all whom it may concern:*

Be it known that I, JOHN AMBROSE FLEMING, professor of electrical engineering, a subject of the King of Great Britain, residing at University College, Gower street, London, in the county of Middlesex, England, have invented certain new and useful Improvements in Instruments for Converting Alternating Electric Currents into Continuous Currents, of which the following is a specification.

This invention relates to certain new and useful devices for converting alternating electric currents, and especially high-frequency alternating electric currents or electric oscillations, into continuous electric currents for the purpose of making them detectable by and measurable with ordinary direct-current instruments, such as a "mirror-galvanometer" of the usual type or any ordinary direct-current ammeter. Such instruments as the latter are not affected by alternating electric currents either of high or low frequency, which can only be measured and detected by instruments called "alternating-current" instruments of special design. It is, however, of great practical importance to be able to detect feeble electric oscillations, such as are employed in Hertzian-wave telegraphy by an ordinary movable coil or movable needle mirror-galvanometer. This can be done if the alternating current can be "rectified"—that is, either suppressing all the constituent electric currents in one direction and preserving the others or else by changing the direction of one of the sets of currents which compose the alternating current so that the whole movement of electricity is in one direction. Many means have been devised and are in use for rectifying low-frequency alternating currents, such as are used in electric lighting. There are well-known forms of mechanical rectifier; also, there is a well-known form of electrochemical rectifier, depending on the fact that when a plate of carbon and aluminium is placed in any electrolyte which yields oxygen on electrolysis an electric current can only pass through this cell in one direction if below a certain voltage. Both these forms of rectifier are, however, inapplicable for high-frequency currents. I have found that the aluminium-carbon cell will not act with high-frequency currents.

I have discovered that if two conductors are inclosed in a vessel in which a good vacuum is made, one being heated to a high temperature, the space between the hot and cold conductors possesses a unilateral electric conductivity, and negative electricity can pass from the hot conductor to the cold conductor, but not in the reverse direction. As the hot conductor should be heated to a very high temperature—say near to the melting-point of platinum, (1,700° centigrade)—it should be of carbon, preferably in the form of a filament such as is used in any ordinary incandescent electric lamp. The cold conductor may be of many materials; but I prefer a bright metal, such as platinum or aluminium or else carbon. The two conductors are inclosed in a glass bulb similar to that of an incandescent lamp, and I generally heat the carbon filament to a high state of incandescence by a continuous electric current, the electrical connection to the filament and the cold conductor being made by platinum wires, sealed air-tight through the glass.

Figure 1 is a full-size sectional elevation of an instrument constructed according to this invention, the electrical connections being shown diagrammatically. This figure illustrates the application of the invention to wireless telegraphy. Figs. 2 and 3 show modifications to smaller scales.

In Fig. 1, $a$ is a glass bulb, and $b$ is a carbon filament like the carbon filament of an incandescent lamp, suitable, say, for taking a current of six to eight volts and two to four amperes. $c$ is a cylinder of aluminium, open at the top and bottom, which surrounds but does not touch the filament. The cylinder $c$ is suspended and steadied by platinum wires $d$, and the ends of the filament $b$ are connected to platinum wires connected to the leads $e$ and $f$. The platinum wires are sealed through the glass in the ordinary manner.

As a very high vacuum should be obtained in the bulb $a$ and as a considerable quantity of air is occluded in the conductors, these should be heated when the bulb is being exhausted. The filament $b$ can be conveniently heated by passing a current through it, while the cylinder $c$ can be heated by surrounding the bulb $a$ with a resistance-coil through which a current is passed, the whole being inclosed in a box lined with asbestos or the like. When, as hereinafter described, the cylinder $c$ is replaced by any form of conductor which can be heated by passing a current through it, this method is usually more convenient than that just described.

The carbon filament is made highly incandescent in the usual way by a continuous electric current produced by the battery $h$, the negative pole of which is connected to the wire $e$ and the positive to the wire $f$. The wires $d$ and $e$ are connected together by a wire $j$, which completes the circuit through the secondary winding $k$ of an induction-coil (such as is ordinarily used in wireless telegraphy) and a galvanometer $l$.

$m$ is the primary winding of the induction-coil, having one end connected, as is usual, to an aerial wire $n$ and the other to earth $o$. The arrangement described above operates as an electric valve and permits negative electricity to flow from the hot carbon $b$ to the metal cylinder $c$, but not in the reverse direction, so that the alternations induced in the coil $k$ by the Hertzian waves received by the aerial wire $n$ are rectified or transformed into a more or less continuous current capable of actuating the galvanometer $l$ by which the signals can be read.

Although Fig. 1 shows the application of the instrument to wireless telegraphy, it will be understood that the aerial wire $n$ may be replaced by any circuit in which there is an alternating electromotive force, whether of low frequency or of high frequency.

I may increase the effect in the following manner: I employ two bulbs arranged as shown in Fig. 2, each being similar to that shown in Fig. 1. $p$ $p$ are the two coils of a differential galvanometer connected to the bulbs in such fashion that currents flowing in opposite directions through the two bulbs flow in the same direction round the two coils of the galvanometer as regards the needle $q$ of the galvanometer itself. For this purpose the hot conductor of each bulb is connected to the cold conductor of the other. Hence one bulb permits negative electricity to flow only in one direction and the other bulb permits only negative electricity to flow in the opposite direction through it. The common terminal of the two galvanometer-coils $p$ is connected to the coil $k$ or any source of alternating electromotive force or of electrical oscillations, the other terminal of the said source being connected to the bulbs, as shown. Each bulb has its own separate insulated battery $h$ for heating its hot filament. Under these circumstances alternating electric currents are split into two continuous currents passing through the two bulbs in opposite and in the two coils of the galvanometer in the same directions. By thus using a differential galvanometer I make use of the whole of the energy of the alternating current instead of discarding half of it. In this manner very feeble electrical oscillations can make themselves apparent by the indication which they give on a sensitive mirror-galvanometer. A number of these valves may be associated together in parallel, as shown in Fig. 3, so that alternating currents rectified by them separately may produce continuous currents which are added together.

In place of using a metal cylinder surrounding a carbon-loop filament I sometimes use a number of carbon filaments. Some of these are heated by means of an electric current and become the hot conductor of the oscillation-valve and the others remain cold and form the cold conductor, or the metal cylinder may be replaced by a cylinder of meerschaum or the like having wound helically upon it a narrow ribbon of metallic foil. In those cases in which a larger alternating current has to be dealt with the hot conductor may be a rod of soft graphitic carbon held in suitable supports.

I find it possible by means of the device described above to rectify an alternating current without the use of any auxiliary continuous heating-current. Thus if I pass through the carbon filament an alternating current to bring it to bright incandescence I find if I connect either terminal of the filament by a circuit outside the bulb with the terminal of the embracing cylinder or other cold-conductor then in this circuit a continuous current flows. Hence the device may be used for rectifying either high-frequency or low-frequency alternating currents of electrical oscillations, provided these are of sufficient strength to render a carbon filament brilliantly incandescent.

It will be understood that when an alternating current is impressed upon a circuit including one of my improved rectifiers, as in Fig. 1, the alternating impulses in one direction will be suppressed and the alternating pulsations in the other direction will pass through the circuit in the form of a pulsating unidirectional current. This pulsating unidirectional current actuates the galvanometer or other continuous-current-indicating instrument $l$. When two rectifiers are used oppositely connected, as in Fig. 2, there will result two unidirectional pulsating currents flowing in opposite directions, and both of these currents are utilized in the differential galvanometer.

When I specify in my claims "means for detecting a continuous current" I intend to include any instrument for detecting such a single unidirectional pulsating current or two such unidirectional pulsating currents flowing in opposite directions.

What I claim is—

1. The combination of a vacuous vessel, two conductors adjacent to but not touching each other in the vessel, means for heating one of the conductors, and a circuit outside the vessel connecting the two conductors.

2. The combination of a vacuous vessel, two conductors adjacent to but not touching each other in the vessel, means for passing an electric current through one of the conductors, and a circuit outside the vessel connecting the two conductors.

3. The combination of a vacuous vessel, two conductors adjacent to but not touching each other in the vessel, means for heating one of the conductors, a circuit outside the vessel connecting the two conductors, means tending to produce an alternating current in the circuit, and means for detecting a continuous current in it.

4. The combination of a vacuous vessel, two conductors adjacent to but not touching each other in the vessel, means for passing an electric current through one of the conductors, a circuit outside the vessel connecting the two conductors, means tending to produce an alternating current in the circuit, and means for detecting a continuous current in it.

5. The combination of a vacuous vessel, two conductors adjacent to but not touching each other in the vessel, means for passing a continuous electric current through one of the conductors, and a circuit outside the vessel connecting the two conductors.

6. The combination of a vacuous vessel, two conductors adjacent to but not touching each other in the vessel, means for passing a continuous electric current through one of the conductors, a circuit outside the vessel connecting the two conductors, means tending to produce an alternating current in the circuit, and means for detecting a continuous current in it.

7. The combination of a vacuous vessel, two conductors adjacent to but not touching each other in the vessel, means for heating one of the conductors, a circuit outside the vessel connecting the two conductors, an induction-coil having its secondary winding in the circuit and its primary winding connected to an aerial wire and earth, and means for detecting a continuous current in the circuit.

8. The combination of a vacuous vessel, two conductors adjacent to but not touching each other in the vessel, means for passing an electric current through one of the conductors, a circuit outside the vessel connecting the two conductors, an induction-coil having its secondary winding in the circuit and its primary winding connected to an aerial wire and earth, and means for detecting a continuous current in the circuit.

9. The combination of a vacuous vessel, two conductors adjacent to but not touching each other in the vessel, means for passing a continuous electric current through one of the conductors, a circuit outside the vessel connecting the two conductors, an induction-coil having its secondary winding in the circuit and its primary winding connected to an aerial wire and earth, and means for detecting a continuous current in the circuit.

10. The combination of a vacuous vessel, a carbon filament in the vessel, a metallic cylinder surrounding but not touching the filament, means for heating the filament, and a circuit outside the vessel connecting the filament to the cylinder.

11. The combination of a vacuous vessel, a carbon filament in the vessel, a metallic cylinder surrounding but not touching the filament, means for passing an electric current through the filament, and a circuit outside the vessel connecting the filament to the cylinder.

12. The combination of a vacuous vessel, a carbon filament in the vessel, a metallic cylinder surrounding but not touching the filament, means for heating the filament, a circuit outside the vessel connecting the filament to the cylinder, means tending to produce an alternating current in the circuit, and means for detecting a continuous current in it.

13. The combination of a vacuous vessel, a carbon filament in the vessel, a metallic cylinder surrounding but not touching the filament, means for passing an electric current through the filament, a circuit outside the vessel connecting the filament to the cylinder, means tending to produce an alternating current in the circuit, and means for detecting a continuous current in it.

14. The combination of a vacuous vessel, a carbon filament in the vessel, a metallic cylinder surrounding but not touching the filament, means for passing a continuous electric current through the filament, and a circuit outside the vessel connecting the filament to the cylinder.

15. The combination of a vacuous vessel, a carbon filament in the vessel, a metallic cylinder surrounding but not touching the filament, means for passing a continuous electric current through the filament, a circuit outside the vessel connecting the filament to the cylinder, means tending to produce an alternating current in the circuit, and means for detecting a continuous current in it.

16. The combination of a vacuous vessel, a carbon filament in the vessel, a metallic cylinder surrounding but not touching the filament, means for heating the filament, a circuit outside the vessel connecting the filament to the cylinder, an induction-coil having its secondary winding in the circuit and its primary winding connected to an aerial wire and earth, and means for detecting a continuous current in the circuit.

17. The combination of a vacuous vessel, a carbon filament in the vessel, a metallic cylinder surrounding but not touching the filament, means for passing an electric current through the filament, a circuit outside the vessel connecting the filament to the cylinder, an induction-coil having its secondary winding in the circuit and its primary winding connected to an aerial wire and earth, and means for detecting a continuous current in the circuit.

18. The combination of a vacuous vessel, a carbon filament in the vessel, a metallic cylinder surrounding but not touching the filament, means for passing a continuous electric current through the filament, a circuit outside the vessel connecting the filament to the cylinder, an induction-coil having its secondary winding in the circuit and its primary winding connected to an aerial wire and earth, and means for detecting a continuous current in the circuit.

19. The combination of two vacuous vessels, two conductors adjacent to but not touching each other in each vessel, means for heating one of the conductors in each vessel, two coils of a differential galvanometer, one coil being connected to the heated conductor in one vessel and the other coil being connected to the unheated conductor in the other vessel, a connection between the other pair of conductors, a connection between the coils, and a circuit connecting the two latter connections.

20. The combination of two vacuous vessels, two conductors adjacent to but not touching each other in each vessel, means for passing an electric current through and so heating one of the conductors in each vessel, two coils of a differential galvanometer, one coil being connected to the heated conductor in one vessel and the other coil being connected to the unheated conductor in the other vessel, a connection between the other pair of conductors, a connection between the coils, and a circuit connecting the two latter connections.

21. The combination of two vacuous vessels, two conductors adjacent to but not touching each other in each vessel, means for passing a continuous electric current through and so heating one of the conductors in each vessel, two coils of a differential galvanometer, one coil being connected to the heated conductor in one vessel and the other coil being connected to the unheated conductor in the other vessel, a connection between the other pair of conductors, a connection between the coils, and a circuit connecting the two latter connections.

22. The combination of two vacuous vessels, two conductors adjacent to but not touching each other in each vessel, means for heating one of the conductors in each vessel, two coils of a differential galvanometer, one coil being connected to the heated conductor in one vessel and the other coil being connected to the unheated conductor in the other vessel, a connection between the other pair of conductors, a connection between the coils, a circuit connecting the two latter connections, and means tending to produce an alternating current in the circuit.

23. The combination of two vacuous vessels, two conductors adjacent to but not touching each other in each vessel, means for passing an electric current through and so heating one of the conductors in each vessel, two coils of a differential galvanometer, one coil being connected to the heated conductor in one vessel and the other coil being connected to the unheated conductor in the other vessel, a connection between the other pair of conductors, a connection between the coils, a circuit connecting the two latter connections, and means tending to produce an alternating current in the circuit.

24. The combination of two vacuous vessels, two conductors adjacent to but not touching each other in each vessel, means for passing a continuous electric current through and so heating one of the conductors in each vessel, two coils of a differential galvanometer, one coil being connected to the heated conductor in one vessel and the other coil being connected to the unheated conductor in the other vessel, a connection between the other pair of conductors, a connection between the coils, a circuit connecting the two latter connections, and means tending to produce an alternating current in the circuit.

25. The combination of two vacuous vessels, a carbon filament in each vessel, a metallic cylinder in each vessel, surrounding but not touching the filament, means for heating the filaments, two coils of a differential galvanometer one coil being connected to the filament in one vessel and the other coil being connected to the cylinder in the other vessel, a connection between the other cylinder and filament, a connection between the coils, and a circuit connecting the two latter connections.

26. The combination of two vacuous vessels, a carbon filament in each vessel, a metallic cylinder in each vessel, surrounding but not touching the filament, means for passing an electric current through the filaments, two coils of a differential galvanometer one coil being connected to the filament in one vessel and the other coil being connected to the cylinder in the other vessel, a connection between the other cylinder and filament, a connection between the coils, and a circuit connecting the two latter connections.

27. The combination of two vacuous vessels, a carbon filament in each vessel, a metallic cylinder in each vessel, surrounding but not touching the filament, means for passing a continuous electric current through the filaments, two coils of a differential galvanometer one coil being connected to the filament in one vessel and the other coil being connected to the cylinder in the other vessel, a connection between the other cylinder and filament, a connection between the coils, and a circuit connecting the two latter connections.

28. The combination of two vacuous vessels, a carbon filament in each vessel, a metallic cylinder in each vessel, surrounding but not touching the filament, means for heating the filaments, two coils of a differential galvanometer one coil being connected to the filament in one vessel and the other coil being connected to the cylinder in the other vessel, a connection between the other cylinder and filament, a connection between the coils, a circuit connecting the two latter connections, and means tending to produce an alternating current in the circuit.

29. The combination of two vacuous vessels, a carbon filament in each vessel, a metallic cylinder in each vessel, surrounding but not touching the filament, means for passing an electric current through the filaments, two coils of a differential galvanometer one coil being connected to the filament in one vessel and the other coil being connected to the cylinder in the other vessel, a connection between the other cylinder and filament, a connection between the coils, a circuit connecting the two latter connections, and means tending to produce an alternating current in the circuit.

30. The combination of two vacuous vessels, a carbon filament in each vessel, a metallic cylinder in each vessel, surrounding but not touching the filament, means for passing a continuous electric current through the filaments, two coils of a differential galvanometer one coil being connected to the filament in one vessel and the other coil being connected to the cylinder in the other vessel, a connection between the other cylinder and filament, a connection between the coils, a circuit connecting the two latter connections, and means tending to produce an alternating current in the circuit.

31. The combination of two vacuous vessels, two conductors adjacent to but not touching each other in each vessel, means for heating one of the conductors in each vessel, two coils of a differential galvanometer, one coil being connected to the heated conductor in one vessel and the other coil being connected to the unheated conductor in the other vessel, a connection between the other pair of conductors, a connection between the coils, a circuit connecting the two latter connections, and an induction-coil having its secondary winding in the circuit and its primary winding connected to an aerial wire and earth.

32. The combination of two vacuous vessels, two conductors adjacent to but not touching each other in each vessel, means for passing an electric current through and so heating one of the conductors in each vessel, two coils of a differential galvanometer, one coil being connected to the heated conductor in one vessel and the other coil being connected to the unheated conductor in the other vessel, a connection between the other pair of conductors, a connection between the coils, a circuit connecting the two latter connections, and an induction-coil having its secondary winding in the circuit and its primary winding connected to an aerial wire and earth.

33. The combination of two vacuous vessels, two conductors adjacent to but not touching each other in each vessel, means for passing a continuous electric current through and so heating one of the conductors in each vessel, two coils of a differential galvanometer, one coil being connected to the heated conductor in one vessel and the other coil being connected to the unheated conductor in the other vessel, a connection between the other pair of conductors, a connection between the coils, a circuit connecting the two latter connections, and an induction-coil having its secondary winding in the circuit and its primary winding connected to an aerial wire and earth.

34. The combination of two vacuous vessels, a carbon filament in each vessel, a metallic cylinder in each vessel, surrounding but not touching the filament, means for heating the filaments, two coils of a differential galvanometer one coil being connected to the filament in one vessel and the other coil being connected to the cylinder in the other vessel, a connection between the other cylinder and filament, a connection between the coils, a circuit connecting the two latter connections, and an induction-coil having its secondary winding in the circuit and its primary winding connected to an aerial wire and earth.

35. The combination of two vacuous vessels, a carbon filament in each vessel, a metallic cylinder in each vessel, surrounding but not touching the filament, means for passing an electric current through the filaments, two coils of a differential galvanometer one coil being connected to the filament in one vessel and the other coil being connected to the cylinder in the other vessel, a connection between the other cylinder and filament, a connection between the coils, a circuit connecting the two latter connections, and an induction-coil having its secondary winding in the circuit and its primary winding connected to an aerial wire and earth.

36. The combination of two vacuous vessels, a carbon filament in each vessel, a metallic cylinder in each vessel, surrounding but not touching the filament, means for passing a continuous electric current through the filaments, two coils of a differential galvanometer one coil being connected to the filament in one vessel and the other coil being connected to the cylinder in the other vessel, a connection between the other cylinder and filament, a connection between the coils, a circuit connecting the two latter connections, and an induction-coil having its secondary winding in the circuit and its primary winding connected to an aerial wire and earth.

37. At a receiving-station in a system of wireless telegraphy employing electrical oscillations of high frequency a detector comprising a vacuous vessel, two conductors adjacent to but not touching each other in the vessel, means for heating one of the conductors, a circuit outside of the vessel connecting the two conductors, means for detecting a continuous current in the circuit, and means for impressing upon the circuit the received oscillations.

JOHN AMBROSE FLEMING.

Witnesses:
H. D. JAMESON,
A. NUTTING.

DISCLAIMER.

803,684.—*John Ambrose Fleming*, London, England. INSTRUMENT FOR CONVERTING ALTERNATING ELECTRIC CURRENTS INTO CONTINUOUS CURRENTS. Patent dated November 7, 1905. Disclaimer filed November 17, 1915, by the assignee, *Marconi Wireless Telegraph Company of America.*

Enters this disclaimer—

"To the combinations of elements set forth in claims 1 to 6, inclusive, and 10 to 15, inclusive, respectively, of said Letters Patent, except as the same are used in connection with high frequency alternating electric currents or electric oscillations of the order employed in Hertzian wave transmission, and to the words in the specification: 'whether of low frequency or,' at page 2, lines 32 and 33; 'either,' at page 2, line 98; and 'or low-frequency alternating currents of,' at page 2, lines 98 and 99."

[*Official Gazette, November 23, 1915.*]